United States Patent Office 3,114,779
Patented Dec. 17, 1963

3,114,779
STABILIZER FOR CHLOROHYDROCARBONS
Ted F. Martens, West Chester, Pa., assignor to E. I. du Pont de Nemours and Company, Wilmington, Del., a corporation of Delaware
No Drawing. Filed Jan. 26, 1961, Ser. No. 84,974
1 Claim. (Cl. 260—652.5)

This invention relates to chlorohydrocarbon compositions stabilized with methacrylonitrile.

For a considerable period of years, chlorohydrocarbons, particularly trichloroethylene and perchloroethylene, have been employed as degreasing solvents in liquid-solvent and vapor-solvent degreasing operations. Solid articles, and particularly metal articles, are subjected to degreasing operations prior to painting, plating, or otherwise coating such articles. Chlorohydrocarbons as commercially produced for use in such operations are well known to be unstable and stabilizers have been universally employed to prevent breakdown of these materials as a result of prolonged exposure thereof to air, light, heat, water, and foreign materials present in the oil and grease coatings on the articles.

More recently, methods of painting metal articles have been developed employing trichloroethylene as paint solvents. These new painting methods with trichloroethylene-thinned paints have shown great promise in view of the nonflammable characteristics of trichloroethylene and because of the ability to conduct such methods at the boiling point of the solvent so that exceedingly rapid drying of the paint application may be accomplished.

It has been found, however, that a stabilizing agent for trichloroethylene intended for use as a paint solvent must meet several important requirements unique to this end use for the chlorohydrocarbon in addition to the classical requirement of preventing decomposition of the chlorohydrocarbon due to exposure to air, light, heat, and moisture. Due to the inability to meet one or more of these special requirements, many of the stabilizers heretofore proposed by the prior art as inhibitors for trichloroethylene are unsatisfactory for use in trichloroethylene when said material is employed as a paint solvent.

A major requirement of the stabilizer arises from the desire, as a practical matter, to reuse the solvent which volatilizes from the painting operation. It is particularly desirable in commercial operations to carry out painting with trichloroethylene-thinned paints in an integrated unit which provides for metal degreasing and painting operations under a common vapor zone of the solvent. Usually in this scheme of operation, the trichloroethylene volatilizing from the painting application, is recovered by a condensation region near the top of the unit and returned to the degreasing compartment in the unit as the sole or major source of solvent for the degreasing operation. Hence, it is a requirement that the stabilizer originally added to trichloroethylene used in formulating the paint possess the same order of volatility as the solvent so that little concentration change of the stabilizing agent occurs in the recovered solvent and the solvent remains suitably inhibited against decomposition for use in the degreasing operation without the need of introducing additional amounts of a stabilizing agent. Of course, when the painting operation is carried out in a unit separate from the degreasing operation, it is still highly desirable to recover the volatilized solvent for reuse in the preparation of additional paint. Again, unless the stabilizing agent has the same volatility characteristics as the trichloroethylene, the recovered solvent will not be protected against decomposition and further amounts of a stabilizing agent must be added.

It is an equally important requirement that the stabilizing agent not be significantly less volatile than the solvent since as the solvent volatilizes from the boiling paint solution the stabilizer accumulates in the paint film and may well interfere with the application of a satisfactory coating or the desired properties in the cured paint film. The technique of applying paint to variously shaped metallic substrates requires that the viscosity, solids content, and other physical and chemical properties be held to relatively critical ranges. The accumulation of many compounds known to function as stabilizers for trichloroethylene would soon interfere with the proper balance of these properties.

As a still further requirement, the stabilizing agent even though it exhibits the desired volatility characteristics relative to the chlorohydrocarbon must not be harmfully reactive with the resins or solids content of the paint while in contact therewith or in any way tend to interfere with the desirable properties of the paint film such as to cause discoloration or unfavorably alter the viscosity or drying properties thereof.

It is, therefore, the object of the present invention to provide means to inhibit the oxidative decomposition of chlorohydrocarbons.

It is a further object of the present invention to provide a stabilizing agent for trichloroethylene intended for use as a paint solvent which will inhibit oxidative decomposition of the solvent without interfering with the application of the paint or the desirable properties of the cured paint film.

It is still a further object of the present invention to provide a stabilizing agent for trichloroethylene intended for use as a paint solvent which will volatilize with the solvent during painting operations and remain the recovered solvent in stabilizing amounts.

The above and other objects may be accomplished in accordance with this invention by adding to the chlorohydrocarbon a stabilizing amount of methacrylonitrile. It is believed to be particularly surprising that methacrylonitrile meets the desideratum of the invention in view of the fact that acrylonitrile which is disclosed in U.S. Patent 2,422,556 as a stabilizing agent for chlorohydrocarbons is found to be wholly unsatisfactory for use with trichloroethylene as a recoverable stabilizer since this material exhibits such high volatility characteristics that with the use of conventional equipment it is nearly completely lost from the system. This result is entirely unexpected in view of the slight difference that exists between the respective boiling points of methacrylonitrile and acrylonitrile.

The amount of methacrylonitrile to be added to the chlorohydrocarbon to gain effective stabilization and to fulfill the other objects noted above will usually be from about 0.05 to 1% by weight based on the chlorohydrocarbon. Smaller amounts can be employed but will be less effective and for shorter periods of time. Larger amounts may be employed but are unnecessary for most purposes and tend to be uneconomical. The methacrylonitrile is very soluble in chlorohydrocarbons and, therefore, may be incorporated directly into the solvent in the amount desired.

A better understanding of the invention will be gained from the following working examples in which the percentages shown are percent by weight.

EXAMPLE 1

A standard stability test was conducted to demonstrate the stabilizing action of methacrylonitrile to prevent oxidation under conditions of heat, light, and oxygen simulating use conditions. The extent of decomposition is measured in terms of acidity and the amount of high boiling polymeric decomposition products formed during the test.

In executing the test, a 200 ml. sample of the solvent to be tested is placed in a flask and is refluxed 4 hours with iron powder during which time the condensed vapors are continuously recycled through a water layer. Concurrently the boiling sample is irradiated with ultraviolet light and oxygen gas is bubbled therethrough.

At the end of the reflux period, the acidity of the water layer is measured and is reported as milliliters of 1.0 N HCl.

A separate sample of the chlorohydrocarbon solvent is removed from the flask and submitted to gas chromatography which is a useful technique for separating the high boiling decomposition products formed during the test. By this technique the relative amounts of such decomposition products formed between various runs can be measured. In this determination a 0.01 ml. sample is injected into a Perkin-Elmer model 159–B vapor fractometer fitted with a 4 meter "K" column employing "Carbowax" 1500 polyethylene glycol as a partitioning agent. The determination is carried out at a temperature of 190° C. The elution tracing which is obtained shows two bands characteristic of the oxidation or decomposition products of the chlorohydrocarbon. The area under these curves is approximated and this figure is reported as a measure of the relative amount of decomposition products present.

An unstabilized trichloroethylene with and without methacrylonitrile was run in accordance with the foregoing test procedure and the results are reported in the table below.

*Table I*

| Composition | Acidity as ml. of 1 N HCl | Rel. Amt. Oxidation Products |
| --- | --- | --- |
| Unstabilized trichloroethylene | 5.2 | 100 |
| Unstabilized trichloroethylene+0.1% methacrylonitrile | 0.4 | 1 |

It will be seen from the results shown in Table 1 that methacrylonitrile is highly effective in inhibiting the decomposition of trichloroethylene. It is to be noted, in particular, that the addition of the small amount of methacrylonitrile nearly completely prevented the formation of high boiling oxidative decomposition products.

EXAMPLE 2

A laboratory test was devised to measure relative stabilizer volatility which has been found experimentally to simulate the stabilizer fractionation that occurs in the operation of a commercial continuous degreaser in which the work is fed continuously on a conveyor unit.

The test employs apparatus involving a 500 ml. flask which is heated with an electrical heating mantle and connected by appropriately insulated glass tubing to a condenser which is fitted with a low hold-up liquid take-off head and controlled with a needle valve assembly.

In executing the test, a 300 ml. sample of the chlorohydrocarbon solvent containing a known amount of stabilizer is placed in the flask and heated to reflux. Samples of liquid condensate are withdrawn through the needle valve assembly at the beginning of the test and at hourly intervals thereafter until equilibration is assured. These samples are analyzed for stabilizer content by vapor chromatography or by any other suitable means and the ratio of the vapor condensate stabilizer concentration to the initial stabilizer concentration is a measure of relative volatility. If the ratio is greater than one, the stabilizer is more volatile than trichloroethylene and there is a loss of stabilizer occurring from the liquid to the condensate system. If the ratio is one, the stabilizer is exhibiting the same order of volatility as that for trichloroethylene and the stabilizer shows no concentration change from liquid to the condensate system. If the ratio is less than one, the stabilizer is less volatile then trichloroethylene and hence an accumulation of stabilizer will occur in the liquid with a commensurate loss in the condensate system.

The relative volatilities of methacrylonitrile and acrylonitrile in unstabilized trichloroethylene were evaluated in this test run under identical conditions and the results are reported in the table below.

*Table II*

| Stabilizer | Percent Concentration in Distillate | | Ratio, Final/Initial |
| --- | --- | --- | --- |
| | Initial | Final | |
| Acrylonitrile | 0.2 | 1.9 | 9.5 |
| Methacrylonitrile | 0.2 | 0.42 | 2.1 |

From the above results it will be noted that in the case of acrylonitrile in trichloroethylene there is a high loss of stabilizer occurring from the liquid to the condensate system. The relative volatility of acrylonitrile is determined to be 4.5 times that for methacrylonitrile and far greater than might be expected from the respective boiling points of these materials relative to the boiling point of trichloroethylene.

EXAMPLE 3

The following test demonstrates the uniqueness of methacrylonitrile over acrylonitrile as a recoverable stabilizer in trichloroethylene used as a paint solvent.

In executing this test, approximately 1500 ml. of a trichloroethylene-thinned paint composition which has previously been refluxed for 400 hours to simulate the prolonged exposure to working temperatures experienced of paints or resins in actual painting systems is introduced into a 2 liter round-bottomed flask provided with a condenser. The amount of stabilizer based on the amount of trichloroethylene in the paint sample is accurately determined and the flask is then heated by means of a "Variac"-controlled heating mantle under carefully controlled conditions to avoid heating the contents of the flask above 95° C. until about 50% of the trichloroethylene from the paint is distilled off. The collected condensate is sampled and analyzed for stabilizer concentration by means of vapor chromatography or by other suitable means and the amount determined together with the initial concentration of stabilizer is reported as a result of the test. Acrylonitrile and methacrylonitrile were evaluated as a recoverable stabilizer by this test method in three different resin-trichloroethylene mixtures reported in the table below as resin-trichloroethylene mixtures A, B, and C. The resin for mixture A is a long oil linseed alkyd, the resin for mixture B is a medium oil soya alkyd, and the resin for mixture C is a chlorinated rubber. The trichloroethylene for each mixture is a commercial grade unstabilized trichloroethylene. The results for these runs are shown in the following table.

*Table III*

| Resin trichloroethylene mixture | Percent Resin | Percent Acrylonitrile | | Percent Methacrylonitrile | |
| --- | --- | --- | --- | --- | --- |
| | | Initial | Final | Initial | Final |
| A | 20 | 0.055 | 0 | | |
| A | 20 | | | 0.396 | 0.360 |
| B | 20 | 0.166 | 0 | | |
| B | 20 | | | 0.363 | 0.360 |
| C | 30 | 0.157 | 0 | | |
| C | 30 | | | 0.344 | 0.305 |

It is obvious from the above results that acrylonitrile is so volatile as to be completely lost to the recovered solvent. By contrast it will be noted that there is but a small concentration change of methacrylonitrile in the recovered solvent and the solvent would be adequately stabilized for reuse without the requirement of introducing additional amounts of a stabilizing agent.

Since many different embodiments of the invention may be made without departing from the spirit and scope thereof, it is to be understood that the invention is not limited by the specific illustrations except to the extent defined in the following claim.

I claim:

A composition for use as a paint solvent consisting essentially of trichloroethylene and from about 0.05 to 1% of methacrylonitrile, based on the weight of said trichloroethylene.

References Cited in the file of this patent

UNITED STATES PATENTS

| | | |
|---|---|---|
| 2,043,260 | Missbach | June 9, 1936 |
| 2,422,556 | Klabunde | June 17, 1947 |
| 2,783,165 | Borushko | Feb. 26, 1957 |
| 3,029,298 | Hirsekorn et al. | Apr. 10, 1962 |

FOREIGN PATENTS

| | | |
|---|---|---|
| 765,522 | Great Britain | Jan. 9, 1957 |
| 591,822 | Canada | Feb. 2, 1960 |